US011602000B1

(12) United States Patent
Marupaduga (10) Patent No.: US 11,602,000 B1
(45) Date of Patent: *Mar. 7, 2023

(54) USE OF MU-MIMO GROUPING EFFICIENCY AS A BASIS TO CONTROL CONFIGURATION OF DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,284

(22) Filed: Jun. 17, 2021

Related U.S. Application Data

(63) Continuation of application No. 16/842,481, filed on Apr. 7, 2020, now Pat. No. 11,102,835.

(51) Int. Cl.
*H04W 76/16* (2018.01)
*H04B 7/0452* (2017.01)
*H04W 28/08* (2009.01)
*H04W 48/20* (2009.01)

(52) U.S. Cl.
CPC .......... *H04W 76/16* (2018.02); *H04B 7/0452* (2013.01); *H04W 28/085* (2013.01); *H04W 48/20* (2013.01)

(58) Field of Classification Search
CPC ... H04W 76/16; H04W 28/085; H04W 48/20; H04B 7/0452
See application file for complete search history.

(56) References Cited

U.S. PATENT DOCUMENTS

| 11,071,159 | B1* | 7/2021 | Marupaduga | ....... H04W 28/085 |
| 11,102,835 | B1* | 8/2021 | Marupaduga | ......... H04W 76/16 |
| 2017/0048692 | A1* | 2/2017 | Huang | .................. H04W 36/08 |
| 2017/0311251 | A1* | 10/2017 | Liu | ....................... H04W 48/20 |
| 2018/0279218 | A1* | 9/2018 | Park | ...................... H04W 48/20 |
| 2019/0387432 | A1* | 12/2019 | Kwak | .................. H04W 28/06 |

(Continued)

FOREIGN PATENT DOCUMENTS

| WO | WO2015117325 | 8/2015 |
| WO | WO2019170209 | 9/2019 |

*Primary Examiner* — Harry H Kim
(74) *Attorney, Agent, or Firm* — McDonnell Boehnen Hulbert & Berghoff LLP (57) ABSTRACT

When a first access node is considering setup of dual-connectivity service for a UE, the first access node could take into consideration the MU-MIMO grouping efficiency respectively of each of one or more candidate second access nodes, in order to decide whether to set up the dual-connectivity service for the UE and/or to decide which of the multiple second access nodes to use for the UE's dual-connectivity service. MU-MIMO grouping efficiency of a given access node could be a representative count of UEs that the access node has provided with MU-MIMO service per unit time. Thus, for instance, the first access node may decide to use a given candidate second access node for the dual-connectivity service of the UE, with the decision being based on the given candidate second access node having a higher MU-MIMO grouping efficiency than one or more other candidate second access nodes.

18 Claims, 5 Drawing Sheets

(56) References Cited

U.S. PATENT DOCUMENTS

| | | | |
|---|---|---|---|
| 2020/0213913 A1* | 7/2020 | Taguchi | ................ H04W 72/04 |
| 2020/0359356 A1* | 11/2020 | Sirotkin | .................... H04L 1/00 |
| 2021/0099893 A1* | 4/2021 | Suzuki | ................. B64C 39/024 |

* cited by examiner

USE OF MU-MIMO GROUPING EFFICIENCY AS A BASIS TO CONTROL CONFIGURATION OF DUAL-CONNECTIVITY SERVICE

REFERENCE TO RELATED APPLICATION

This is a continuation of U.S. patent application Ser. No. 16/842,481, filed Apr. 7, 2020, the entirety of which is hereby incorporated by reference.

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. (In practice, an access node might provide multiple cells, each on a different respective carrier. But for simplicity, each cell in that scenario could be considered to be provided by a different respective access node.)

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

When a UE enters into coverage of an example network, the UE could detect threshold strong coverage of an access node in a particular cell (e.g., a threshold strong reference signal broadcast by the access node on that carrier of that cell) and could then engage in random-access and connection signaling, such as Radio Resource Control (RRC) signaling, to establish an air-interface connection (e.g., RRC connection) through which the access node will then serve the UE in that cell.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

For each such downlink transmission, the UE could then determine if the UE received transport block successfully.

For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the access node a positive acknowledgement (ACK) control message, and the access node could then proceed with transmission of a next transport block (if any) to the UE. Whereas, if the UE did not receive the transmission or determined that the CRC did not match and thus that there was an error in the received transport block, then the UE could transmit to the access node a negative acknowledgement (NACK), in response to which the access node could attempt the transmission again.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

As with downlink transmission, for each transport block that the UE transmits to the access node, the access node could determine if the transport block arrived successfully, based on a CRC analysis for instance. And if the access node received the transmission successfully, then the access node could transmit to the UE an ACK and could schedule a next uplink transmission from the UE. Whereas, if the access node did not receive the transmission successfully, then the access node could transmit to the UE a NACK, and the UE could attempt retransmission to the access node.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT ("first-RAT access node") and a second access node that provides service according to a second RAT ("second-RAT access node"), and a UE positioned within coverage of the cell site could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying one or more SNs and associated carriers for which the UE should scan, and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one implementation, the split bearer could be established at the gateway, with one bearer leg extending between the gateway and the MN and another bearer leg extending between the gateway and the SN. For instance, while maintaining the UE's access bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the SN or just the MN providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just the SN or just the MN.

One technical issue with any such wireless communication system is its level of spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, an access node can engage in air interface communication concurrently on multiple different radio-frequency (RF) propagation paths, or MIMO "layers," with multiple layers occupying the same frequency resources (e.g., subcarriers and PRBs) as each other. To facilitate this, the access node could be equipped with a MIMO antenna array, comprising multiple transmit antennas and multiple receive antennas. By suitably weighting and precoding transmissions by particular antennas in the array, the access node can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thus increasing the access nodes' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when an access node has data to transmit to a UE, the access node could time-division-multiplex the data into multiple data streams, the access node could modulate the data streams onto the same PRBs as each other, and the access node could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the access node's transmit signals.

Further, MIMO can also be used in a "multi-user MIMO" (MU-MIMO) configuration to increase the data capacity of the air interface by allowing communications to multiple UEs to use the same air-interface resources as each other. For instance, an access node can modulate data streams destined to each of multiple UEs on the same PRBs as each other and can transmit the modulated data streams on a separate respective propagation paths for receipt by the UEs. To facilitate this, the access node could pre-code transmissions on each propagation path using weighted coefficients based on channel estimates from the UEs, in a manner that enables each UE to remove cross-talk and receive its intended data. Further, the access node could beamform the transmissions respectively to each UE to help physically distinguish the transmissions from each other. In theory, MU-MIMO could thus increase the data capacity of the air interface by allowing an access node to serve more UEs at a time without requiring additional air-interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per TTI. To help overcome that limitation, the provider may equip its access nodes with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

When an access node serves many UEs at once, the access node could beneficially apply MU-MIMO in order to provide concurrent high-throughput transmissions to the UEs.

For example, if the access node's air interface has 100 PRBs per TTI and the access node has a massive-MIMO array as discussed above, then, with MU-MIMO, the access node could theoretically transmit concurrently to 8 UEs with 2 layers apiece on all 100 of those PRBs. By comparison, if instead of applying MU-MIMO, the access node were to apply just SU-MIMO with 2 layers apiece for each of those 8 UEs, then the access node might transmit to each UE with 2 layers on just about 12 PRBs, thus providing lower throughput.

To facilitate MU-MIMO service, the UEs that will share air-interface resources (e.g., PRBs) should be "orthogonal" to each other, meaning that each UE could receive spatially separate transmissions from the access node without undue interference from the access node's transmissions to each other UE. The access node could deem UEs to be sufficiently orthogonal to each other if each UE has reported threshold high signal-to-noise-plus-interference ratio (SINR), and/or if the UEs are located at positions that are physically separate enough from each other that the access node's RF transmission paths to the UEs would have sufficient angular separation, among other possibilities.

Thus, when an access node is going to apply MU-MIMO (perhaps in response to the access node being heavily loaded with connected UEs with high throughput requirements, or perhaps as a proactive measure), the access node could work to group its connected UEs for MU-MIMO service. On a per TTI basis for instance, the access node could evaluate the UEs to establish one or more MU-MIMO groups, with each MU-MIMO group consisting respectively of two or more of the access node's connected UEs deemed to be sufficiently orthogonal to each other. And the access node might then transmit to the UEs of each group respectively on the same PRBs as each other.

At times when an access node is able to serve a greater number of the access node's connected UEs with MU-MIMO service (e.g., when the access node's connected UEs are more spread apart from each other and/or otherwise are more orthogonal to each other), the spectral efficiency of the access node may be greater, and the access node's overall resource availability for serving other UEs may be greater. Whereas, at times when an access node can serve fewer connected UEs with MU-MIMO service, the spectral efficiency of the access node may be lesser, and the access node's overall resource availability for serving other UEs may be lesser.

The present disclosure provides an improvement to help leverage this MU-MIMO grouping efficiency in the context of dual-connectivity setup.

In accordance with the disclosure, when an MN is considering setup of dual-connectivity service for a UE, the MN will take into consideration the MU-MIMO grouping efficiency of each of one or more potential (candidate) SNs in order decide whether to set up dual-connectivity service for the UE and/or to decide which of multiple SNs to use as an SN for the UE's dual-connectivity service. Here, MU-MIMO grouping efficiency of a given candidate SN could be measured as the number of UEs that the candidate SN has served with MU-MIMO per unit time, such as on average over a recent sliding window, among other possibilities as an evaluation of the extent to which the candidate SN has been able to provide MU-MIMO service.

For instance, if a candidate SN has threshold low MU-MIMO grouping efficiency, then, based on that fact, the MN may decide to not use that SN for dual-connectivity service of the UE. Or if a first candidate SN has higher MU-MIMO grouping efficiency than a second candidate SN, then, based on that fact, the MN may decide to use the first SN rather than the second SN for dual-connectivity service of the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
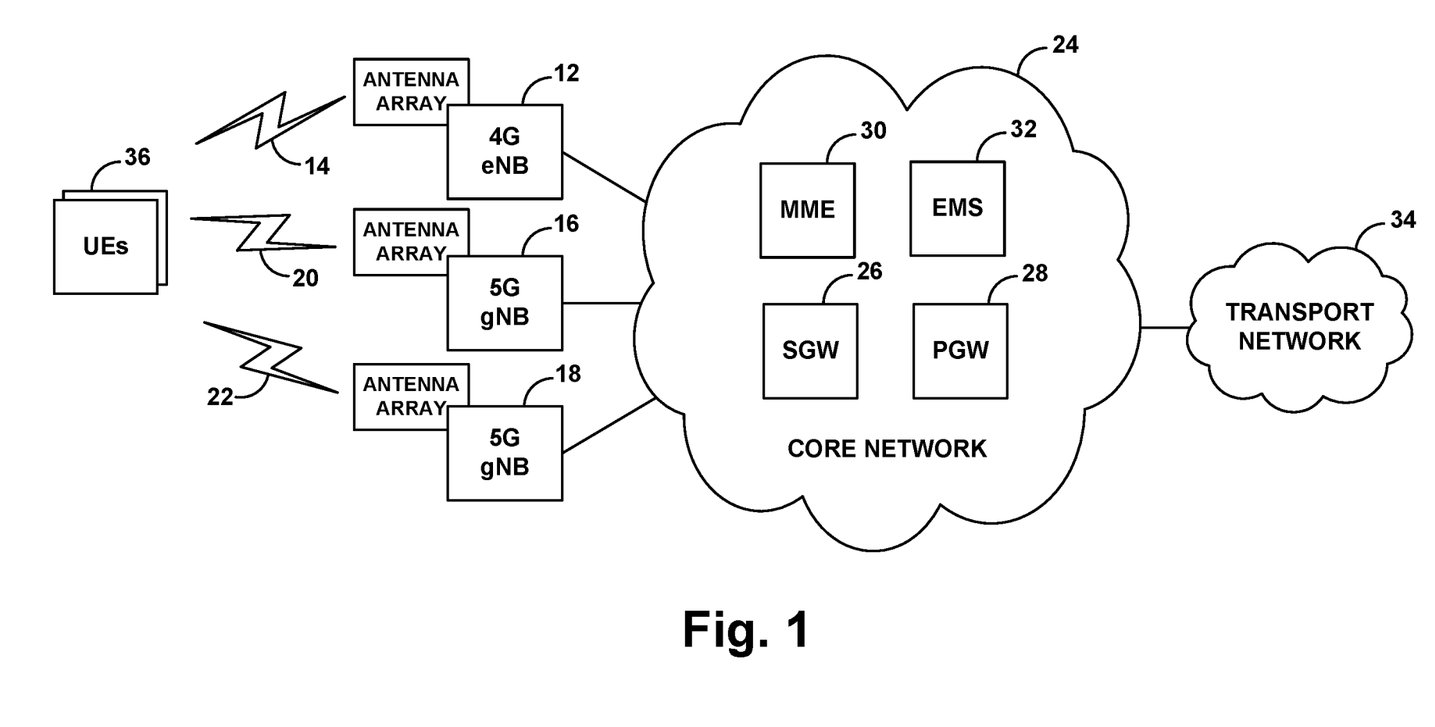
FIG. 1 is a simplified block diagram of an example network arrangement in which features of the present disclosure can be implemented.

FIG. 1 depicts an example network having a 4G eNB 12 that is configured to provide 4G service on a representative 4G carrier 14, and at least two example 5G gNBs 16, 18, configured to provide 5G service on representative 5G carriers 20, 22. Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, these access nodes could be collocated with each other and could provide coverage in largely the same direction as each other, to define an area in which UEs can engage in both 4G service provided by the 4G eNB 12 and 5G service provided by a 5G gNB 16, 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the example 4G and 5G access nodes in the example arrangement are each connected with a core network 24, such as an Evolved Packet Core (EPC) network or Next Generation Core (NGC) network. In the example shown, the core network includes a serving gateway (SGW) 26, a packet data network gateway (PGW) 28, a mobility management entity (MME) 30, and an element management system (EMS) 32, although other arrangements are possible as well.

In an example implementation, without limitation, each access node could have an interface with the SGW, the SGW could have an interface with the PGW, and the PGW could provide connectivity with a transport network 34. Further, each access node could have an interface with the MME, and the MME could have an interface with the SGW, so that the MME could coordinate setup of bearers for UEs to enable the UEs to engage in packet-data communication via 4G and 5G. Alternatively, just the 4G eNB might have an interface with the MME and may function as an anchor for signaling with the MME both for 4G service and for 5G and EN-DC service. Still further, the EMS could operate as a central repository of operational data for the wireless communication network and to control and manage operation of various network elements.

FIG. 1 further depicts various example UEs 36 that may from time to time be within coverage of the 4G and 5G access nodes and may from time to time be served by the access nodes. In a representative implementation, each such UE may be 4G and 5G capable, including both a 4G radio and associated equipment and logic that enables the UE to connect with and be served by a 4G eNB, and a 5G radio and associated equipment and logic that enables the UE to connect with and be served by a 5G gNB. Further, each such UE could also be configured to support EN-DC service.

In line with the discussion above, upon entering into coverage of the access nodes as shown, a representative such UE 36 could initially scan for 4G coverage and discover threshold strong coverage of 4G eNB 12 on 4G carrier 14. The UE could then engage in RRC signaling with that 4G eNB to establish a 4G connection on the 4G carrier as discussed above. And if appropriate, the UE could engage in attach signaling with the MME through the 4G connection, and the MME could coordinate setup of a bearer for the UE. Further, the 4G eNB could then select a 5G gNB to provide secondary connectivity for the UE, and the 4G eNB could coordinate setup of EN-DC service for the UE, including setup for the UE of a 5G connection with the selected 5G gNB on a 5G carrier, and setup of a split bearer as discussed above. The 4G eNB and 5G gNB could then each serve the UE with packet-data communications over their respective connections with the UE, in the manner discussed above.

In practice, each such access node may serve multiple connected UEs at a time. Each UE that the access node serves may be engaged in dual-connectivity service, being concurrently served by one or more other access nodes or may be engaged in single-connectivity service, being concurrently served by just that access node. For instance, the 4G eNB might serve a number of connected UEs that have EN-DC service by the 4G eNB and an example one of the 5G gNBs, and the 4G eNB might serve a number of connected UEs with just standalone 4G LTE service. And each 5G gNB might serve a number of connected UEs that have EN-DC service by the 4G eNB and the 5G gNB, and the 5G gNB might serve a number of connected UEs with just standalone 5G NR service.

When an access node serves multiple connected UEs at once, the access node may face a need to schedule data transmissions concurrently to multiple such UEs. Because each access node's air interface has just a finite, limited number of PRBs per unit time (e.g., per subframe), the access node could implement a scheduling algorithm in an effort to fairly and appropriately allocate the PRBs among the access node's served UEs. Yet the base station may still face load issues or may still seek to most efficiently use its available resources.

As noted above, the access node could apply MU-MIMO to facilitate serving multiple UEs at once on the same PRBs as each other, so as to help provide the UEs with a desired level of throughput while also achieving increased spectral efficiency. As further noted above, one way to provide such MIMO service is with use of a massive-MIMO antenna array. Thus, in an example implementation, each access node in FIG. 1 could be equipped with a massive-MIMO antenna array, or one or more of the access nodes might share use of a common such antenna array.

Figure 2:
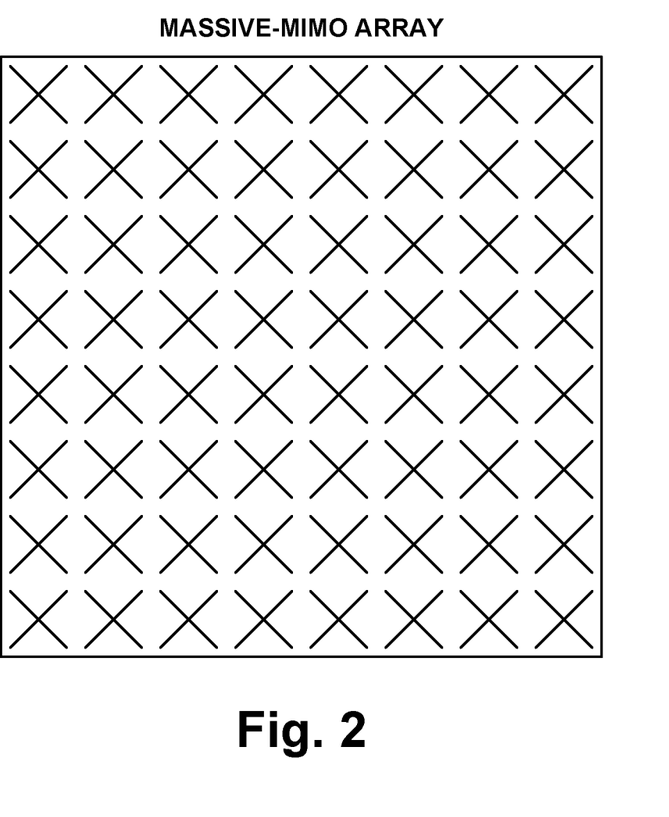
FIG. 2 is a simplified diagram of an example massive-MIMO antenna array that could be implemented according to the disclosure.

FIG. 2 is a simplified diagram of an example massive-MIMO array that could be implemented at or for a representative access node, such as respectively for the 4G eNB 12 and for each 5G gNB 16, 18. In this illustration, each X represents two antennas (or antenna elements), one with positive polarization and one with negative polarization. As a result, each column in the example array includes eight antennas with positive polarization and eight antennas with negative polarization. As there are eight columns of antennas, the example massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, an access node may be able to provide 16 layers of MIMO transmission. For instance, for each layer, the access node could use 4 of its transmit antennas to provide beamformed transmission defining a respective MIMO layer. Thus, the access node could in theory transmit with up to 16 layers on a common set of air interface resources (e.g., PRBs). Other MIMO arrangements are possible as well.

As noted, the access node could transmit individual MIMO layers to UEs, by beamforming and/or pre-coding the transmissions. For example, the access node could beamform transmissions to an individual UE by evaluating angle of arrival of uplink signals (e.g., an uplink sounding-reference-signal) from the UE or determining geolocation of the UE, and setting phase and amplitude of downlink transmission from various antenna elements so as to direct the transmission toward the UE. Further, the access node could pre-code individual transmissions to a UE to help the UE distinguish those transmissions from others and extract the transmissions from a combination of received downlink signals. For instance, the access node could transmit one or more downlink modulation reference signals (DMRSs) that the UE can receive and evaluate in order to establish and report channel estimates, and the access node could use those channel estimates as a basis to pre-code transmissions with weighted coefficients that enable the UE to receive and uncover the transmissions.

Assuming sufficient orthogonality between UEs of a group, the access node could thus transmit to the UEs of the group on the same PRBs as each other, i.e., at the same time and on the same subcarriers as each other. The transmissions to the UEs would occupy the same PRBs as each other, but would be distinguished from each other through beamforming, pre-coding, and/or one or more other mechanisms.

Thus, in each downlink subframe, the access node could allocate a given set of PRBs to each of multiple UEs of a MU-MIMO group and could provide downlink transmission on the allocated PRB(s) respectively to each UE of the MU-MIMO group, using one or more MIMO layers respectively for each UE. To configure MU-MIMO service for each UE in a MU-MIMO group, the access node may engage in signaling with the UE to obtain channel estimates and precoding information, and the access node may work with the UE through DCI signaling to prepare the UE for receipt of beamformed and pre-coded transmissions or the like.

The access node could thus theoretically allocate all of the PRBs of a subframe to a MU-MIMO group, so that each UE of the MU-MIMO group can receive data transmissions on one or more MIMO layers within all of those PRBs. Alternatively, the access node might allocate some of the PRBs of the subframe to a first MU-MIMO group of UEs and transmit to those UEs with MIMO layers on those PRBs, the access node might allocate other PRBs of the subframe to a second MU-MIMO group of UEs and transmit to those UEs with MIMO layers on those PRBs, and so forth. Further, the access node might allocate some or all of the PRBs of a given subframe for use without MIMO or in other ways.

As discussed above, at issue in this process could be which UEs the access node should group together for MU-MIMO service, i.e., to be served with communications on the same air-interface resources (e.g., PRBs) as each other. In practice, the access node could address this question per downlink subframe. For instance, in anticipation of each downlink subframe, the access node could determine for each of its connected-mode UEs that the access node has data buffered for downlink transmission, how soon the data needs to be transmitted, and how many UEs are at issue. Further, the access node could consider its air-interface capacity in the subframe, such as how many PRBs are available for the access node to allocate in the subframe. And based on these and/or other factors, the access node could determine that applying MU-MIMO for transmission in the subframe could be helpful, and the access node could then work to determine which of the UEs the access node should group together for MU-MIMO service.

As noted above, the access node could group UEs together for MU-MIMO service with the grouping being based on the UEs of the group being sufficiently orthogonal to each other. As further noted above, the access node could evaluate orthogonality in various ways.

By way of example, the access node could receive from each UE a report of SINR for transmissions from the access node, and the access node could deem a UE to be sufficiently orthogonal to one or more other UEs if the UE's reported SINR is at least threshold high. As another example, by evaluating phases and other metrics for uplink received signals, the access node could determine for each UE what the angle of arrival is for transmissions from the UE, and the access node could deem UEs to be sufficiently orthogonal to each other if their respective angles of arrival are threshold different than each other. And as yet another example, by applying any of various geolocation-determination techniques, the access node could determine the geolocation respectively of each UE, and the access node could deem UEs to be sufficiently orthogonal to each other if their geolocations are threshold far apart from each other.

As further discussed above, the 4G eNB could take into account the MU-MIMO grouping efficiency of each of one or more candidate 5G gNBs in order to decide whether to set up EN-DC service for the UE and/or in order to decide which of multiple 5G gNBs to use as an SN for the UE's EN-DC service.

In a representative implementation, the 4G eNB could first identify a candidate set of one or more 5G gNBs available for possible use in EN-DC service of the UE. The 4G eNB could be pre-provisioned with data indicating this candidate set, perhaps one or more 5G gNBs that provide coverage collocated with coverage of the 4G eNB. Or the 4G eNB could direct the UE to scan for 5G coverage and could receive in response from the UE a report indicating that the UE has detected threshold strong coverage of each of one or more such 5G gNBs defining the candidate set. In the arrangement of FIG. 1, the candidate set might be 5G gNBs 16, 18. Or the candidate set might be just one of those 5G gNBs. And in another arrangement, the candidate set may include one or more other 5G gNBs, perhaps more than two.

The 4G eNB could then decide, based on the MU-MIMO grouping efficiency respectively of each 5G gNB of the candidate set, whether to set up EN-DC service for the UE. For instance, the 4G eNB could determine whether the MU-MIMO grouping efficiency respectively of each 5G gNB of the candidate set is less than (e.g., less than or equal to) a predefined threshold (e.g., a threshold set by engineering design as being particularly low). If the 4G eNB thus determines that the MU-MIMO grouping efficiency of each 5G gNB of the candidate set is less than the predefined threshold, then, based on that determination, the 4G eNB could decide to not set up EN-DC service for the UE. Whereas if the 4G eNB thus determines that the MU-MIMO grouping efficiency of at least one 5G gNB of the candidate set is not less than the predefined threshold, then, based on that determination, the 4G eNB could decide to set up EN-DC service for the UE. The 4G eNB could then proceed accordingly.

Further, if there are at least two 5G gNBs in the candidate set, the 4G eNB could use the MU-MIMO grouping efficiency per 5G gNB as a basis to select a 5G gNB from among those in the candidate set to be an SN for the UE's EN-DC service. For instance, the 4G eNB could compare the MU-MIMO grouping efficiencies of the candidate 5G access nodes (perhaps candidate 5G gNB each deemed to have no less than the threshold MU-MIMO grouping efficiency), and the 4G eNB could select one of the 5G gNBs to be an SN for the UE's EN-DC service, with the selecting being based on a determination by the 4G eNB that the MU-MIMO grouping efficiency of the selected 5G gNB is higher than the MU-MIMO grouping efficiency respectively of each other 5G gNB of the candidate set.

In practice, as noted above, MU-MIMO grouping efficiency of a given 5G gNB could be measured as the number of UEs that the 5G gNB has served with MU-MIMO per unit time, such as on average over a recent sliding window, among other possibilities. For instance, MU-MIMO grouping efficiency could be computed as an average, over a recent sliding window, of the number of UEs that the 5G gNB served with MU-MIMO (e.g., included in a MU-MIMO group) per downlink subframe. This possible range of this number might vary for a given 5G gNB based on its carrier bandwidth and associated quantity of PRBs per subframe, based on the 5G gNB's processing power, and based on the size of the 5G gNB's antenna array. Further, the threshold low level of MU-MIMO grouping efficiency could be preset by engineering design to be a number deemed sufficiently low.

To facilitate this process, the 4G eNB could have access to and refer to MU-MIMO-grouping-efficiency data that indicates a latest measure of MU-MIMO grouping efficiency respectively FOR each of various 5G gNBs.

Each such 5G gNB could regularly (e.g., periodically) determine its MU-MIMO grouping efficiency and could report this information to the 4G eNB and/or to another entity, such as the EMS or the MME, that the 4G eNB might query for the information or that might otherwise provide the information to the 4G eNB or make use of the information to control the 4G eNB's configuration of EN-DC service for the UE.

Note also that the MU-MIMO grouping efficiency per 5G gNB could include current data (e.g., over a most recent or most-recently reported sliding window of time) and/or could include historical data, such as a rolled up average of the 5G gNB's determined MU-MIMO grouping efficiency per time of day or the like, to facilitate a prediction of the 5G gNB's MU-MIMO grouping efficiency at a current time of day. And note that the 4G eNB could keep track over time of each 5G gNB's reported MU-MIMO grouping efficiency.

The 4G eNB could thus refer to the MU-MIMO-grouping efficiency data to determine for each 5G gNB of the candidate set whether the MU-MIMO grouping efficiency of the 5G gNB is predefined threshold low. This could involve determining if the 5G gNB's actual/current MU-MIMO grouping efficiency is threshold low. Alternatively or additionally, this could involve predicting, based on historical MU-MIMO-grouping-efficiency data, whether the 5G gNB's MU-MIMO grouping efficiency is now or is about to be threshold low—such as by determining that the 5G gNB tends to have a threshold low MU-MIMO grouping efficiency at the current time of day.

As noted above, based on this analysis, the 4G eNB could thus decide whether to set up EN-DC service for a UE. Further, based on this analysis, the 4G eNB could select a 5G gNB from the candidate set based on the selected 5G gNB having a higher MU-MIMO grouping efficiency than each of one or more other 5G gNBs of the candidate set. The 4G eNB could then set up EN-DC service for the UE with respect to the selected 5G gNB, including coordinating setup of a 5G connection between the UE and the selected 5G gNB and coordinating setup of a split bearer for the UE, to allow the 4G eNB to serve a portion of the UE's data communications and the selected 5G gNB to serve another portion of the UE's data communications.

Note that MU-MIMO grouping efficiency could be one of possibly multiple factors considered by the 4G eNB in deciding whether to set up EN-DC service for the UE and/or deciding which of multiple candidate 5G gNBs to use as an SN for EN-DC service of the UE. The 4G eNB might also take into account other, additional factors, such as reported buffer-occupancy, signal strength, transmission power, resource usage, and/or the like.

Further, note that the determined MU-MIMO grouping efficiency of each 5G gNB might vary over time, as noted above. For instance, at times when the 5G gNB is serving UEs that are more distant from each other, having greater angular separation and/or having greater SINR, and/or when the 5G gNB is less heavily loaded, the 5G gNB might have greater MU-MIMO grouping efficiency. Whereas, at times when the 5G gNB is serving UEs that are located closer to each other, having lesser angular separation and/or having lesser SINR, and/or when the 5G gNB is more heavily loaded, the 5G gNB might have lesser MU-MIMO grouping efficiency.

Therefore, the analysis conducted by the 4G eNB, taking into consideration the MU-MIMO grouping efficiency respectively of each of various candidate 5G gNBs, may produce different results from time to time. For instance, at times, the 4G eNB might find that the MU-MIMO grouping efficiency respectively of every 5G gNB of a set of multiple candidate 5G gNBs is threshold low, and the 4G eNB might therefore decline to configure EN-DC service, whereas at other times, the 4G eNB might find that the MU-MIMO grouping efficiency of one or more 5G gNBs of the set is not threshold low, and the 4G eNB might therefore select one of the candidate 5G gNBs to be an SN for EN-DC service. Further, at times, given a set of multiple candidate 5G gNBs to be an SN for EN-DC service, the 4G eNB might select one of the 5G gNBs to be the SN on grounds that that 5G gNB has the highest MU-MIMO grouping efficiency among the candidates, whereas at other times, given the same set of candidate 5G gNBs, the 4G eNB might select a different one of the 5G gNBs to be the SN on grounds that that different 5G gNB has the highest MU-MIMO grouping efficiency among the candidates.

Figure 3:
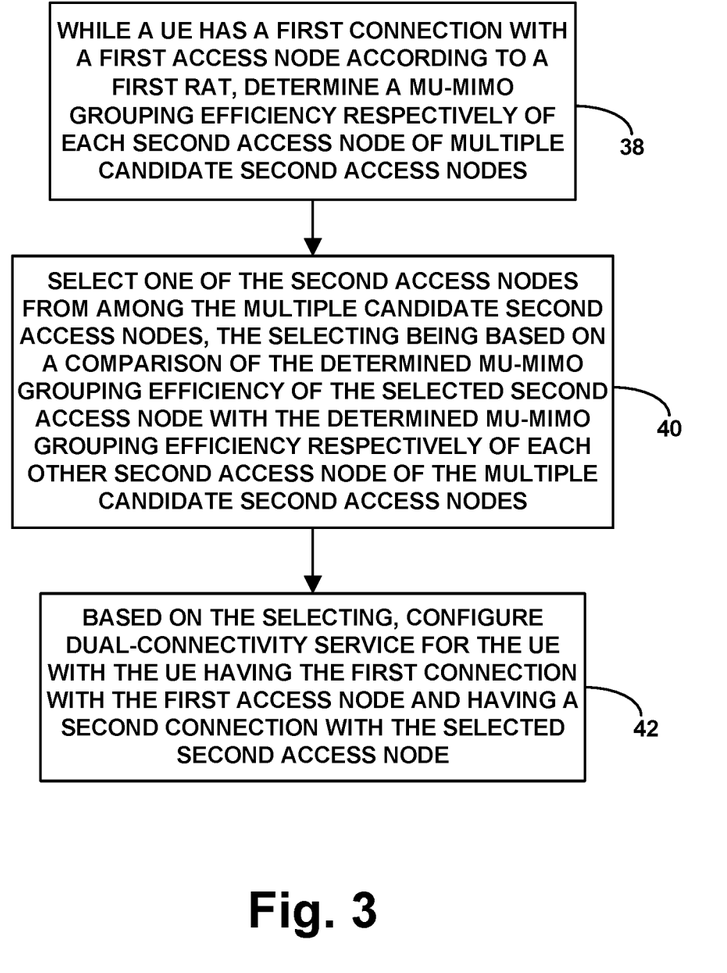
FIG. 3 is a flow chart depicting an example method in accordance with the present disclosure.

FIG. 3 is next a flow chart depicting an example method for controlling configuration of dual-connectivity service for a UE, the dual-connectivity service including the UE being served concurrently over a first connection according to a first RAT and over a second connection according to a second RAT. In an example implementation, the first RAT could be 4G LTE, the second RAT could be 5G NR, and the dual-connectivity service could be EN-DC. Further, the method could be carried out in a wireless communication system such as that shown in FIG. 1, including a first access node configured to provide service according to the first RAT and multiple second access nodes each configured to provide service according to the second RAT.

As shown in FIG. 3, at block 38, the method includes, while the UE has a first connection with a first access node according to the first RAT, the first access node determining MU-MIMO grouping efficiencies of multiple candidate second access nodes, including determining a MU-MIMO grouping efficiency respectively of each second access node of the multiple candidate second access nodes. At block 40, the method then includes the first access node selecting one of the second access nodes from among the multiple candidate second access nodes, the selecting being based on a comparison of the determined MU-MIMO grouping efficiency of the selected second access node with the determined MU-MIMO grouping efficiency respectively of each other second access node (one or more) of the multiple candidate second access nodes. And at block 42, the method include, based on the selecting, configuring the dual-connectivity service for the UE with the UE having the first connection with the first access node and having the second connection with the selected second access node.

In line with the discussion above, in this method, the act of determining the MU-MIMO grouping efficiency respectively of each of at least one of the second access nodes could involve receiving from the second access node the MU-MIMO grouping efficiency, the MU-MIMO grouping efficiency of the second access node representing an extent to which the second access node provides MU-MIMO service. In practice, the MU-MIMO grouping efficiency of each such second access node could be based on a count of UEs that the second access node has served with MU-MIMO service per unit time.

Alternatively or additionally, the act of determining the MU-MIMO grouping efficiency respectively of each of at least one of the second access nodes could involve receiving an indication of the MU-MIMO grouping efficiency from a network entity to which the second access node reported the MU-MIMO grouping efficiency. For instance, the second access node might report its MU-MIMO grouping efficiency to an EMS or other network entity, and the first access node might query that network entity to determine the second access node's MU-MIMO grouping efficiency.

Further, as discussed above, the MU-MIMO grouping efficiency respectively of at least one of the second access nodes could be based on historical data, over one or more past days, for a current time of day. For instance, the second access node could report a rolled up statistical representation of its typical MU-MIMO grouping efficiency for a current time of day, determined based on past days' measures of MU-MIMO grouping efficiency at or around the same time of day. Or the first access node or another entity (e.g., EMS or MME) could compile measures of MU-MIMO grouping efficiency of the second access node per time of day so as to establish such trend data as a basis for predicting what the second access node's MU-MIMO grouping efficiency is likely to be at a current time of day.

In addition, as discussed above, the act of selecting one of the second access nodes from among the multiple candidate second access nodes could be based on the determined MU-MIMO grouping efficiency of the selected second access node being higher than the determined MU-MIMO grouping efficiencies of each other second access node of the multiple candidate second access nodes, such as being highest among the multiple candidate second access nodes.

Further, as discussed above, the act of configuring the dual-connectivity service for the UE with the UE having the first connection with the first access node and having the second connection with the selected second access node could involve the first access node engaging in signaling (e.g., with the selected second access node and the UE) to configure the second connection between the UE and the candidate second access node and the first access node engaging in signaling (e.g., with the second access node, with a core-network controller, and with the UE) to establish for the UE a split bearer so that the first access node and second access node can both serve the UE with data communications.

Figure 4:
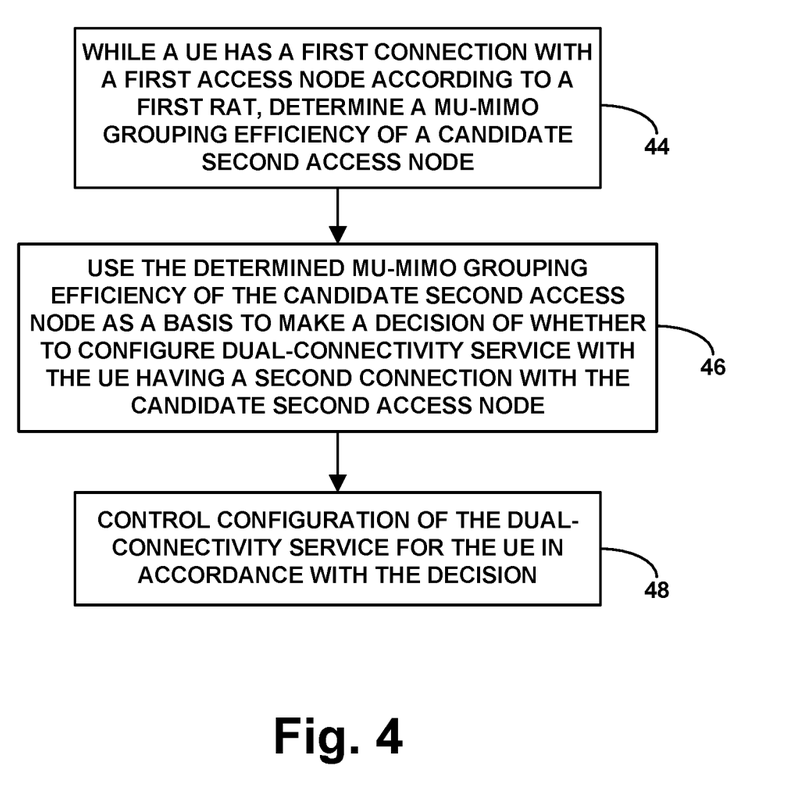
FIG. 4 is another flow chart depicting an example method in accordance with the present disclosure.

FIG. 4 is next another flow chart depicting an example method for controlling configuration of dual-connectivity service for a UE, the dual-connectivity service including the UE being served concurrently over a first connection according to a first RAT and over a second connection according to a second RAT. This method could be implemented in a context similar to that discussed above for instance.

As shown in FIG. 4, at block 44, the method includes, while the UE has a first connection with a first access node according to the first RAT, the first access node determining a MU-MIMO grouping efficiency of a candidate second access node. At block 46, the method then includes the first access node using the determined MU-MIMO grouping efficiency of the candidate second access node as a basis to make a decision of whether to configure the dual-connectivity service with the UE having the second connection with the candidate second access node. And at block 50, the method includes the first access node controlling configuration of the dual-connectivity service for the UE in accordance with the decision.

In line with the discussion above, in this method, the act of determining the MU-MIMO grouping efficiency of the candidate second access node could involve receiving from the candidate second access node a report of the MU-MIMO grouping efficiency of the candidate second access node, the MU-MIMO grouping efficiency of the candidate second access node representing an extent to which the candidate second access node has provided MU-MIMO service. Alternatively, the act of determining the MU-MIMO grouping efficiency of the candidate second access node could involve receiving an indication of the MU-MIMO grouping efficiency from a network entity to which the candidate second access node reported the MU-MIMO grouping efficiency.

Further, the act of determining the MU-MIMO grouping efficiency of the candidate second access node could involve determining an actual current (e.g., most recently computed) MU-MIMO grouping efficiency of the candidate second access node or could involve predicting the MU-MIMO grouping efficiency of the candidate second access node based on historical data for instance.

In addition, as discussed above, the act of using the determined MU-MIMO grouping efficiency of the candidate second access node as a basis to make the decision of whether to configure the dual-connectivity service with the UE having the second connection with the candidate second access node could involve (i) making a determination of whether the determined MU-MIMO grouping efficiency of the candidate second access node is at least predefined threshold low and (ii) responsive to the determination being that the determined MU-MIMO grouping efficiency of the candidate second access node is at least predefined threshold low, then, based at least on the determination, deciding to not configure the dual-connectivity service with the UE having the second connection with the candidate second access node. As discussed above, if the first access node makes this determination for each of the UE's one or more candidate second access nodes, then the first access node may decline to configure the dual-connectivity service for the UE.

Further, as discussed above, the act of using the determined MU-MIMO grouping efficiency of the candidate second access node as a basis to make the decision of whether to configure the dual-connectivity service with the UE having the second connection with the candidate second access node could involve (i) making a determination of whether the determined MU-MIMO grouping efficiency of the candidate second access node is less than a determined MU-MIMO grouping efficiency of another candidate access node, (ii) if the determination is that the determined MU-MIMO grouping efficiency of the candidate second access node is less than the determined MU-MIMO grouping efficiency of the other candidate access node, then, based at least on the determination, deciding to not configure the dual-connectivity service with the UE having the second connection with the candidate second access node, and (iii) if the determination is that the determined MU-MIMO grouping efficiency of the candidate second access node is not less than the determined MU-MIMO grouping efficiency of the other candidate access node, then, based at least on the determination, deciding to configure the dual-connectivity service with the UE having the second connection with the candidate second access node.

And in this case, if the determination is that the determined MU-MIMO grouping efficiency of the candidate second access node is less than the determined MU-MIMO grouping efficiency of the other candidate access node, then the method could additionally involve, based at least on that determination, configuring the dual-connectivity service with the UE having the second connection with the other candidate access node rather than with the candidate second access node.

Various features described above can be implemented in this context, and vice versa.

Figure 5:
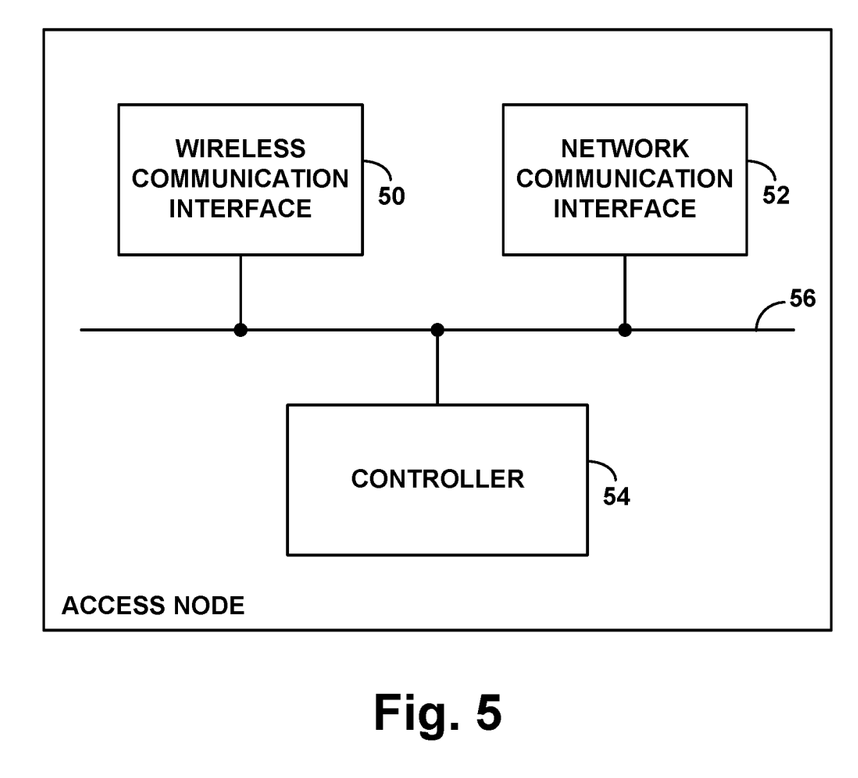
FIG. 5 is a simplified block diagram of an example access node operable in accordance with the present disclosure.

FIG. 5 is next a simplified block diagram of depicting an example first access node that could operate in accordance with the present disclosure. As shown, the example first access node includes a wireless communication interface 50, a network communication interface 52, and a controller 54, all of which may be communicatively linked together by a system bus, network, or other connection mechanism 56.

In the context discussed above, this first access node could be configured to engage in air-interface communication and to provide service according to a first RAT through the wireless communication interface 50. Further, the first access node could be provided in a wireless communication system that includes multiple second access nodes each configured to provide service according to a second RAT. As noted above, these access nodes may be collocated.

In this example first access node, the wireless communication interface 50 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 52 could comprise a wired or wireless interface, such as an Ethernet network communication interface, configured to support communication with other entities, such as with the other access node and various core-network entities.

Further, controller 54 could comprise a processing unit (e.g., one or more general purpose processors and/or specialized processors) programmed to cause the first access node to carry out various operations such as those discussed above. For instance, the controller could comprise non-transitory data storage (e.g., one or more magnetic, optical, or flash storage components) holding program instructions executable by the processing unit to cause the access node to carry out such operations.

In an example implementation, these operations could include, when a UE has a first connection with the first access node according to the first RAT (a) determining MU-MIMO grouping efficiencies of the second access nodes, including determining a MU-MIMO grouping efficiency respectively of each second access node of the multiple second access nodes, (b) selecting one of the second access nodes from among the multiple second access nodes, the selecting being based on the determined MU-MIMO grouping efficiency of the selected second access node being highest of the determined MU-MIMO grouping efficiencies of the multiple candidate second access nodes, and (c) based on the selecting, configuring the dual-connectivity service for the UE, with the UE having the first connection with the first access node and having the second connection with the selected second access node.

Various features discussed above could be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:

determining, by a first access node with which the UE has the first connection according to the first RAT, Multi-User Multiple-Input-Multiple-Output (MU-MIMO) grouping efficiencies of multiple candidate second access nodes, including determining a MU-MIMO grouping efficiency respectively of each second access node of the multiple candidate second access nodes;

selecting by the first access node one of the second access nodes from among the multiple candidate second access nodes, the selecting being based on a comparison of the determined MU-MIMO grouping efficiency of the selected second access node with the determined MU-MIMO grouping efficiency respectively of each other second access node of the multiple candidate second access node; and based on the selecting, configuring the dual-connectivity service for the UE, with the UE having the first connection with the first access node and having the second connection with the selected second access node.

2. The method of claim 1, wherein determining the MU-MIMO grouping efficiency respectively of each of at least one of the second access nodes comprises receiving from the second access node an indication of the MU-MIMO grouping efficiency, wherein the MU-MIMO grouping efficiency of the second access node represents an extent to which the second access node provides MU-MIMO service.

3. The method of claim 1, wherein the MU-MIMO grouping efficiency respectively of each of at least one of the second access nodes is based on a count of UEs that the second access node has served with MU-MIMO per unit time.

4. The method of claim 1, wherein the MU-MIMO grouping efficiency respectively of at least one of the second access nodes is based on historical data, over one or more past days, for a current time of day.

5. The method of claim 1, wherein the selecting is based on the determined MU-MIMO grouping efficiency of the selected second access node being highest of the determined MU-MIMO grouping efficiencies of the multiple candidate second access nodes.

6. The method of claim 1, wherein the first RAT is 4G Long Term Evolution (LTE), wherein the second RAT is 5G New Radio (NR), and wherein the dual-connectivity service is EUTRA-NR Dual Connectivity (EN-DC).

7. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:
   determining, by a first access node with which the UE has the first connection according to the first RAT, a Multi-User Multiple-Input-Multiple-Output (MU-MIMO) grouping efficiency of a candidate second access node;
   using, by the first access node, the determined MU-MIMO grouping efficiency of the candidate second access node as a basis to make a decision of whether to configure the dual-connectivity service with the UE having the second connection with the candidate second access node; and
   controlling, by the first access node, configuration of the dual-connectivity service for the UE in accordance with the decision.

8. The method of claim 7, wherein determining the MU-MIMO grouping efficiency of the candidate second access node comprises receiving from the candidate second access node a report of the MU-MIMO grouping efficiency of the candidate second access node, wherein the MU-MIMO grouping efficiency of the candidate second access node represents an extent to which the candidate second access node has provided MU-MIMO service.

9. The method of claim 7, wherein determining the MU-MIMO grouping efficiency of the candidate second access node comprises receiving an indication of the MU-MIMO grouping efficiency from a network entity to which the candidate second access node reported the MU-MIMO grouping efficiency.

10. The method of claim 7, wherein determining the MU-MIMO grouping efficiency of the candidate second access node comprises predicting the MU-MIMO grouping efficiency of the candidate second access node.

11. The method of claim 7, wherein using the determined MU-MIMO grouping efficiency of the candidate second access node as a basis to make the decision of whether to configure the dual-connectivity service with the UE having the second connection with the candidate second access node comprises:
   making a determination of whether the determined MU-MIMO grouping efficiency of the candidate second access node is less than a determined MU-MIMO grouping efficiency of another candidate access node;
   if the determination is that the determined MU-MIMO grouping efficiency of the candidate second access node is less than the determined measure of MU-MIMO grouping efficiency of the other candidate access node, then, based at least on the determination, deciding to not configure the dual-connectivity service with the UE having the second connection with the candidate second access node; and
   if the determination is that the determined MU-MIMO grouping efficiency of the candidate second access node is not less than the determined MU-MIMO grouping efficiency of the other candidate access node, then, based at least on the determination, deciding to configure the dual-connectivity service with the UE having the second connection with the candidate second access node.

12. The method of claim 11, further comprising:
   if the determination is that the determined MU-MIMO grouping efficiency of the candidate second access node is less than the determined MU-MIMO grouping efficiency of the other candidate access node, then, based at least on the determination, configuring the dual-connectivity service with the UE having the second connection with the other candidate access node rather than with the candidate second access node.

13. The method of claim 7, wherein the first RAT is 4G Long Term Evolution (LTE), wherein the second RAT is 5G New Radio (NR), and wherein the dual-connectivity service is EUTRA-NR Dual Connectivity (EN-DC).

14. In a wireless communication system comprising a first access node configured to provide service according to a first radio access technology (RAT) and a plurality of second access nodes each configured to provide service according to a second RAT, the first access node comprising:
   a wireless communication interface through which to engage in air-interface communication and provide the service according to the first RAT; and
   a controller, wherein the controller is configured to cause the first access node to carry out operations when a user equipment device (UE) has a first connection with the first access node according to the first RAT, the operations including:
      determining Multi-User Multiple-Input-Multiple-Output (MU-MIMO) grouping efficiencies of the plurality of second access nodes, including determining a MU-MIMO grouping efficiency respectively of each second access node of the plurality of second access nodes,
      selecting one of the second access nodes from among the plurality of second access nodes, the selecting being based on the determined MU-MIMO grouping efficiency of the selected second access node being highest of the determined MU-MIMO grouping efficiencies of the plurality of second access nodes, and
      based on the selecting, configuring the dual-connectivity service for the UE, with the UE having the first connection with the first access node and having the second connection with the selected second access node.

15. The first access node of claim 14, wherein determining the MU-MIMO grouping efficiency respectively of each of at least one of the second access nodes comprises receiving from the second access node an indication of the MU-MIMO grouping efficiency, wherein the MU-MIMO grouping efficiency of the second access node represents an extent to which the second access node provides MU-MIMO service.

16. The first access node of claim 14, wherein the MU-MIMO grouping efficiency of at least one of the second access nodes is based on historical data, over one or more past days, for a current time of day.

17. The first access node of claim 14, wherein the first RAT is 4G Long Term Evolution (LTE), wherein the second RAT is 5G New Radio (NR), and wherein the dual-connectivity service is EUTRA-NR Dual Connectivity (EN-DC).

18. The first access node of claim 14, wherein the controller comprises one or more processors, non-transitory data storage, and program instructions stored in the non-transitory data storage and executable by the one or more processors to cause the first access node to carry out the operations.

\* \* \* \* \*